United States Patent [19]

Altman

[11] Patent Number: 4,882,735
[45] Date of Patent: Nov. 21, 1989

[54] MODULAR UV PREIONIZATION PACKAGE FOR A CO$_2$ LASER

[75] Inventor: Michael P. Altman, Washington Mills, N.Y.

[73] Assignee: United Technologies Corporation, East Hartford, Conn.

[21] Appl. No.: 279,126

[22] Filed: Dec. 1, 1988

[51] Int. Cl.$^4$ ............................................. H01S 3/097
[52] U.S. Cl. ..................................... 372/86; 372/103; 372/83
[58] Field of Search ..................... 372/86, 87, 61, 103, 372/92, 83, 92

[56] References Cited

U.S. PATENT DOCUMENTS

| | | | |
|---|---|---|---|
| 4,491,949 | 1/1985 | Beck et al. | 372/86 |
| 4,503,542 | 3/1985 | Cirkel et al. | 372/86 |
| 4,554,667 | 11/1985 | Kaminski | 372/87 |
| 4,637,031 | 1/1987 | Gürs et al. | 372/87 |
| 4,686,682 | 8/1987 | Haruta et al. | 372/87 |
| 4,703,489 | 10/1987 | Ross | 372/87 |
| 4,802,185 | 1/1989 | Kyusho | 372/87 |

Primary Examiner—Léon Scott, Jr.
Attorney, Agent, or Firm—Perman & Green

[57] ABSTRACT

To eliminate a parasitic optical pulse and achieve other advantages a TEA CO$_2$ gas laser has a sealed module 10 for providing photoionization radiation to a lasant gas mixture comprised of CO$_2$. The sealed module includes a photoionization gas comprised of N$_2$ and an envelope 12 for containing the photoionization gas. The module further includes within the envelope a preionizer device for inducing the photoionization gas to emit electromagnetic radiation within a predetermined range of wavelengths. The device is preferably a corona discharge type of semiconductor preionizer although spark discharge devices such as trigger wires, gaps and the like may be employed instead. The module further includes a window 32 which is comprised of material, such as LiF, that is substantially transparent to electromagnetic radiation within the predetermined range of wavelengths for coupling the electromagnetic radiation out of the envelope. Electrical terminals 18 and 20 exit the envelope and serve to conductively couple the preionizer to a source of high voltage energy. A laser includes at least one and preferably a pair of such sealed modules which flank the discharge region and which isolate the CO$_2$ lasant gas from the N$_2$ photoionization gas.

19 Claims, 2 Drawing Sheets

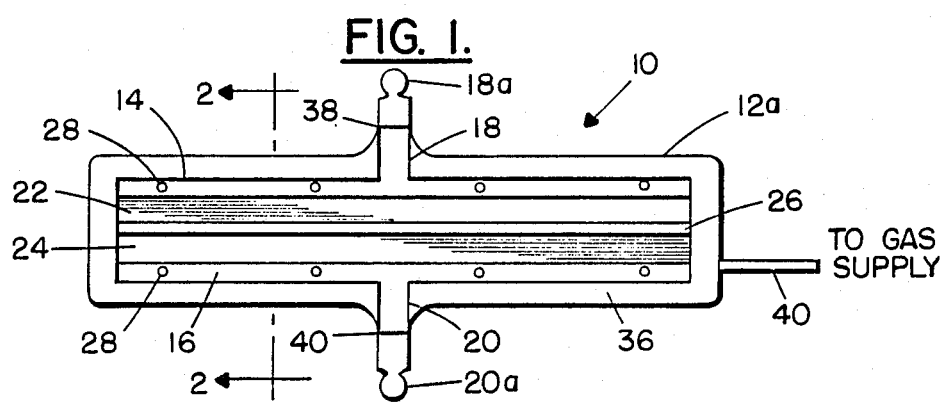
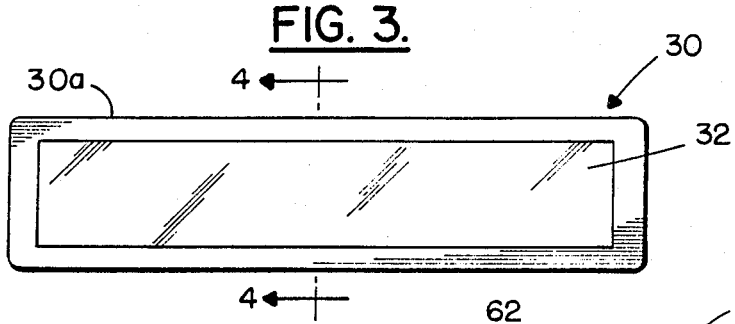
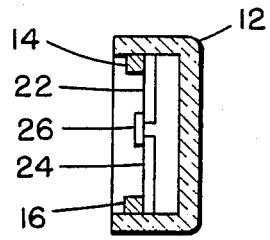
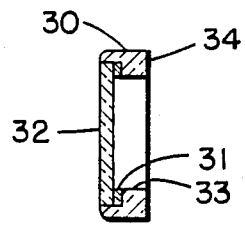
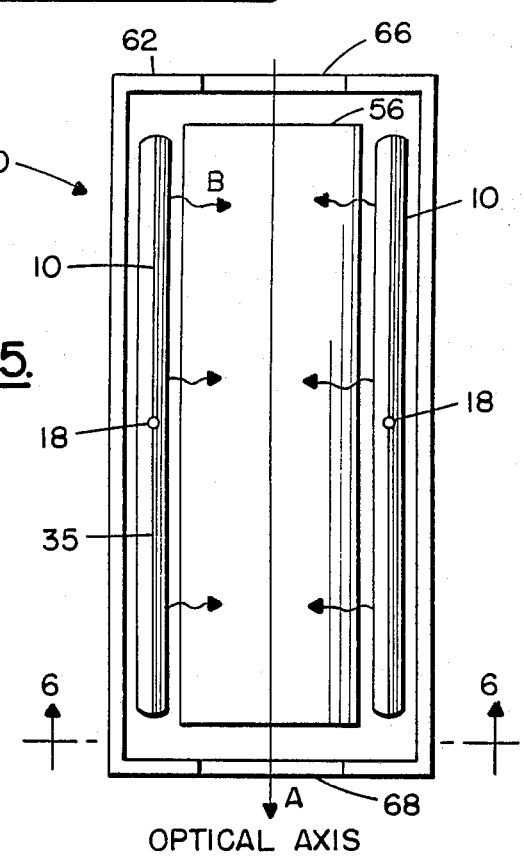

MODULAR UV PREIONIZATION PACKAGE FOR A $CO_2$ LASER

CROSS REFERENCE TO A RELATED PATENT APPLICATION

This application is related to allowed patent application Ser. No. 07/272,726 filed Nov. 17, 1988, entitled "$CO_2$ TEA Laser Having Isolated Preionization Compartments", by M. P. Altman and assigned to the assignee of this application.

FIELD OF THE INVENTION

This invention relates generally to gas lasers and, in particular, to a preionization module for a $CO_2$ TEA laser, the module having a sealed envelope containing a preionization gas mixture and an ionization device, the module further having a window comprised of material which is substantially transparent to UV preionizing radiation which is generated within the module.

BACKGROUND OF THE INVENTION

A gas mixture of a $CO_2$ Transverse Electric Atmospheric (TEA) laser typically comprises a mixture of $CO_2/He/N_2$. As a result an optical pulse output includes a desired large main pulse and an undesirable parasitic tail pulse which follows the main pulse. The optical energy of the main pulse primarily results from $CO_2$-electron collisions while the energy of the parasitic tail pulse results from excited nitrogen molecules which repump the $CO_2$ molecules in the ground state. The He gas functions as an inert carrier and as such does not contribute in any appreciable manner to the optical energy output. The $N_2$ gas functions as a preionization, or pulse conditioning, means by providing ultraviolet (UV) radiation to $CO_2$ molecules within an electrical discharge region located between a pair of high voltage electrodes.

In order to function as a source of UV radiation the $N_2$ gas is typically excited by a spark gap, semiconductor preionizer or some other suitable means. The $N_2$ photoionizes the $CO_2$ gas by supplying UV photons which are absorbed by the $CO_2$. The $CO_2$ thereafter emits electrons, thereby ionizing the main discharge region. However, due to the presence of $N_2$ within the discharge region, the aforementioned $N_2$—$CO_2$ ground state pumping effect also occurs resulting in the generation of the parasitic tail pulse.

For some applications, such as a laser range finder, the presence of the parasitic tail pulse not only decreases the power of the main pulse but may also mask returns from relatively nearby targets. Thus, the strong suppression or the total elimination of the parasitic pulse is a desirable goal in such applications.

Previously known methods of reducing the parasitic tail pulse include providing a Q-switch or removing the $N_2$ altogether from the laser. The installation of a Q-switch is disadvantageous in that it adds additional cost and complexity to the laser. The removal of $N_2$ from the laser is also disadvantageous in that the UV radiation supplied by the $N_2$ is an important element of the preionization.

SUMMARY OF THE INVENTION

The foregoing problems are overcome and other advantages are realized by a sealed module for providing photoionization radiation to a lasant gas mixture comprised of $CO_2$. In accordance with the invention the sealed module includes a photoionization gas comprised of $N_2$ and an envelope for containing the photoionization gas. The module further includes within the envelope a device for inducing the photoionization gas to emit electromagnetic radiation within a predetermined range of wavelengths. The device is preferably a corona discharge type of semiconductor preionizer although spark discharge devices such as trigger wires, gaps and the like may be employed instead. The module further includes a window which is comprised of material substantially transparent to electromagnetic radiation within the predetermined range of wavelengths for coupling the electromagnetic radiation out of the envelope. For example, the window may comprise a planar sheet of LiF, $MgF_2$ or any suitable UV transparent material. Electrical terminals exit the envelope and serve to conductively couple the preionizer to a source of high voltage energy.

In a $CO_2$ laser which is constructed in accordance with the invention one or more of the sealed modules are provided substantially adjacent to the main discharge region. In an illustrative embodiment the main discharge region is flanked on each side by a nitrogen containing sealed preionization module. Radiation within a range of wavelengths between approximately 0.1 micrometers and approximately 0.2 micrometers is coupled through the module window and photoionizes the $CO_2$ lasant gas.

The invention provides at least one sealed module within a TEA gas laser for separating the $CO_2$ lasant gas from the $N_2$ preionization gas, thereby eliminating the parasitic tail pulse which is generated by the excited $N_2$ molecules repumping the $CO_2$ molecules. The invention further provides for the compositions of the gas mixtures of the preionization compartments and the main discharge compartment to be separately optimized. Furthermore, for those TEA lasers which include catalytic material for recombining CO and $O_2$ into $CO_2$ the absence of $N_2$ within the main discharge compartment provides that all available recombination sites on the catalyst are available for $CO_2$ recombination. Also, by removing the $N_2$ from the main discharge compartment the $N_2$ is isolated from oxygen atoms which result from the dissociated $CO_2$. Thus, the formation of $NO_x$ species is prevented thereby making all of the dissociated $O_2$ available for $CO_2$—$O_2$ recombination. Furthermore, in that $NO_x$, in sufficient quantities, is detrimental to laser performance an increase in laser lifetime and operational stability is realized.

BRIEF DESCRIPTION OF THE DRAWING

The foregoing and other aspects of the invention will be made more apparent in the following Detailed Description of the Invention when read in conjunction with the Drawing, wherein:

FIG. 1 is a view of a back portion of a photoionization module;

FIG. 2 is a side, cutaway view of the portion of FIG. 1 taken along the section line 2—2;

FIG. 3 is a view of a front portion of the photoionization module;

FIG. 4 is a side, cutaway view of the portion of FIG. 3 taken along the section line 4—4;

FIG. 5 is a top cross-sectional view, not to scale, of a TEA $CO_2$ gas laser having an embodiment of the invention wherein a main discharge compartment is disposed between a pair of photoionization modules;

DETAILED DESCRIPTION OF THE INVENTION

Figure 6:
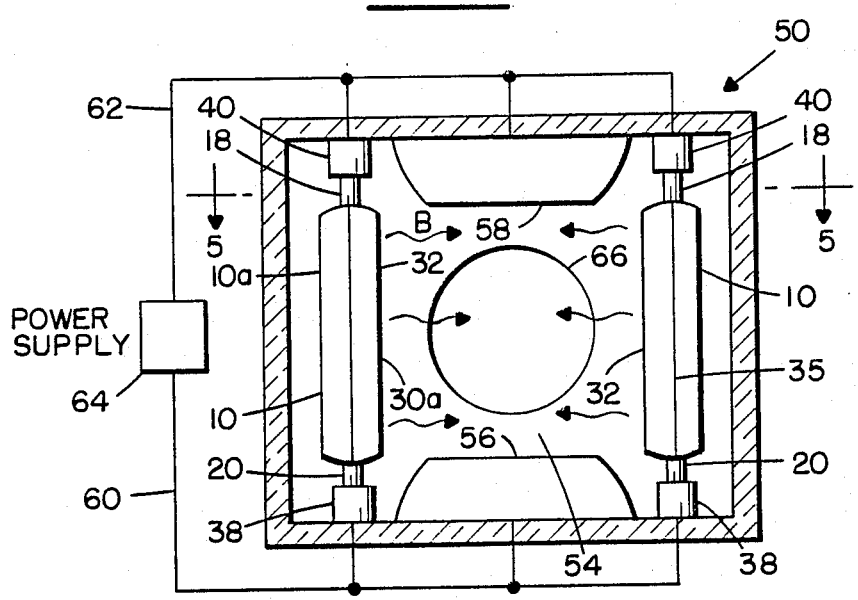
FIG. 6 is a cross-sectional view of the TEA laser of FIG. 5 taken along the section line 6—6.

The following description of the invention will be made in the context of a sealed TEA $CO_2$ gas laser resonator which operates at approximately one atmosphere of lasant gas pressure. It should be realized however that the invention is equally applicable to flowing gas TEA lasers and to TEA lasers which operate at other than one atmosphere of pressure. The invention is also applicable to TEA lasers which operate as amplifiers for amplifying electromagnetic radiation from another source.

Referring first to FIGS. 1 and 2 there is shown a front view and a cross sectional view, respectively, of a back portion of a preionizer module 10. This back portion comprises approximately one half of an envelope 12. In a preferred embodiment of the invention the envelope is comprised of glass although any material suitable for installation within a gas laser may be employed. Contained within envelope 12 are an upper and a lower nickel strip electrode 14 and 16, respectively. Nickel strip electrodes 14 and 16 each have an extension 18 and 20, respectively, which extends outward through the glass envelope 12. Each conductive extension is terminated with a suitable electrical coupling pin or connector such as the spherical couplers 18a and 20a. Couplers 18a and 20a conductively couple the strip electrodes 14 and 16 to a source of high voltage as will be described. Electrically coupled to nickel strip electrodes 14 and 16 is a preionizing device which, in this embodiment of the invention, is a corona discharge type of device comprised of two strips of silicon carbide 22 and 24 which are separated by a ceramic element 26. The operation of such corona discharge devices is known in the art. Alternatively, the preionization discharge device may be a spark gap, trigger wire, or any suitable known means for inducing a preionization gas to emit ultraviolet radiation. The silicon carbide strips 22 and 24 are conductively coupled to the nickel strip electrodes 14 and 16 by a plurality of screws 28.

A front portion of the module 10 is comprised of a glass envelope 30 which has a window 32 which is hermetically sealed to the envelope 30. In accordance with the invention the window is a planar body of material which substantially transparent to radiation within a wavelength range of approximately 0.1 to 0.2 micrometers. The window 32 is comprised of LiF although $MgF_2$ or any suitable transparent material may be employed.

The front and back envelope portions are joined together along surfaces 34 and 36, the seam between these two surfaces, indicated by the numeral 35 in FIGS. 5 and 6, being joined by a suitable technique such as by use of an acetylene torch. The electrode extensions 18 and 20 are brazed to the envelope along braze lines 38 and 40.

In a preferred embodiment of the invention the front envelope portion 30 has a nickel collar 31 brazed around the opening 33. The UV transparent window 32 is thereafter Torr-sealed to the nickel collar 31.

After the front portion 30 is joined to the back portion 10 and the electrical pins are suitably brazed to the glass envelope a preionization gas mixture is introduced into the module 10 by means of a pinch off tube 40. The gas composition within the module 10 is optimized for the desired preionization requirement and thereafter the pinch off tube 40 is heat sealed.

The preionization gas mixture within the module 10 may comprise 100% $N_2$ or may be a mixture of $N_2$ and He. For example, the gas mixture may be 80% $N_2$ and 20% He. The gas mixture may also comprise $N_2$ and Xe.

Referring now to FIGS. 5 and 6 there are shown two views of a TEA gas laser 50 constructed and operated in accordance with invention. Laser 50 comprises a housing 52 which includes a main discharge compartment 54 having a pair of high voltage discharge electrodes 56 and 58 disposed therein. Electrodes 56 and 58 may have any suitable profile and are coupled via leads 60 and 62, respectively, to a high voltage power supply 64. Power supply 64 is preferably a pulsed output power supply which may have a 22 KV discharge potential having a pulse width of approximately 100–150 nanoseconds. Compartment 54 contains a lasant gas mixture which comprises $CO_2$/He. The gas pressure within compartment 54 may be in the range of 1.0 to 1.2 atmospheres although in some lasers constructed in accordance with the invention the pressure may be several atmospheres. An electrical pulse generated by power supply 64 and coupled to the electrodes 56 and 58 induces the $CO_2$ gas disposed therebetween to emit electromagnetic radiation having a characteristic wavelength. Disposed on opposite ends of compartment 54 are a totally reflecting mirror 66 and a partially reflecting/partially transmitting mirror 68. Mirrors 66 and 68 define therebetween an optical axis of a resonant cavity structure from which a coherent pulse of optical radiation, indicated by the letter A, is emitted from the laser 50. In that the lasant gas mixture comprises $CO_2$ this pulse of optical radiation has a characteristic wavelength of 10.6 micrometers.

In accordance with the invention the laser 54 further comprises first and second photoionization modules 10. Modules 10 are disposed on opposite sides of main discharge compartment 54 and are substantially parallel to a longitudinal axis of compartment 54. Modules 10 contain, as previously described, $N_2$ gas and also, typically, He. Modules 10 also each contain a preionization device such as the aforementioned corona discharge type of semiconductor preionizer.

In the laser 50 of FIG. 5 and FIG. 6 modules 10 are each electrically coupled to the main electrodes 56 and 58, via terminals 18 and 20, by electrical couplers 38 and 40. Preferably, couplers 38 and 40 allow for the module 10 to "plugged-in" facilitating the installation and replacement of a module. When the power supply 64 applies a pulsed potential to electrodes 56 and 58 the preionizers within the modules 10 are simultaneously energized and induce the $N_2$ gas within the modules 10 to emit UV radiation, indicated by the arrows B. In other embodiments of the invention the modules 10 may be coupled to a separate power supply the operation of which is synchronized with the operation of power supply 64. As can be seen, the $CO_2$ gas within the main discharge compartment 54 is isolated from the $N_2$ by the sealed window and envelope of modules 10. As was previously stated, windows 32 are comprised of a material which is substantially transparent to the UV radiation emitted by the $N_2$ gas within the modules 10; suitable materials being LiF or $MgF_2$.

In accordance with the invention the UV radiation B generated within modules 10 is coupled into the main discharge compartment 34 through the substantially transparent windows 32. The UV radiation is absorbed by and ionizes the $CO_2$ gas within compartment 54. This has the beneficial effect of reducing the electrical breakdown potential of the $CO_2$ gas. After several nanoseconds the electrical potential across the electrodes 56 and 58 discharges through the $CO_2$, resulting in a pulse of coherent radiation to be emitted by the laser 50. The UV photoionization photons also improve the spatial uniformity of the main discharge and suppress arcing between the electrodes 56 and 58.

Typical dimensions for the laser 50 shown in FIGS. 5 and 6 are as follows. Electrodes 56 and 58 may each have a width of approximately 2 centimeters and a length of approximately 10 centimeters. The spacing between the electrodes 56 and 58 is approximately one centimeter. The thickness of the windows 32 is approximately 2-4 mm. The overall module 10 envelope dimensions are such that window 32 has approximately the same surface area and shape as the longitudinal cross section of the discharge region between the electrodes 56 and 58. For example, for the embodiment shown in FIGS. 5 and 6 the window 32 is approximately 10 centimeters in length and has a width of approximately one centimeter.

The total lasant gas volume within the main discharge compartment 54 may be approximately 65 ml. Typically the gas mixture within the modules 10 also comprises He which, at relatively high repetition rates, tends to improve the thermal conductivity of the photoionization gas mixture. Preferably the modules 10 run parallel to the electrodes 56 and 58 for approximately the entire length of the electrodes in order to preionize substantially the entire discharge region.

It should be realized that the benefits of the invention may be realized by providing one module 10 on one side of the main discharge compartment instead of the two illustrated in FIGS. 5 and 6. However, it has been found that providing photoionization modules which are symmetrically disposed about the discharge region, as illustrated in FIGS. 5 and 6, improves the overall mode quality of the laser in that the photoionization occurs uniformly throughout the discharge region. This results in an improvement in the laser spatial mode pattern.

Figure 7A:
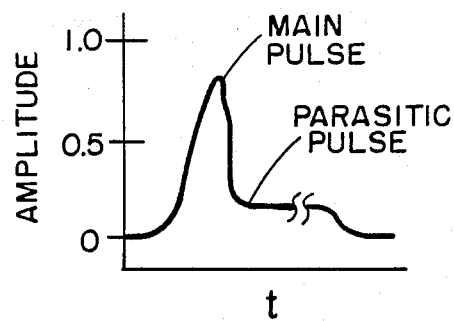
FIG. 7 shows two representative laser pulse outputs which illustrate the beneficial effect of the invention in reducing the parasitic optical tail pulse.
Figure 7B:
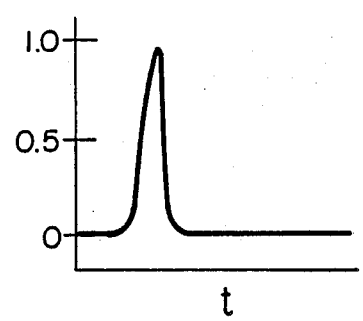

It should be appreciated that the use of the invention provides a number of advantages in the operation of a TEA $CO_2$ laser. In that the $N_2$ is physically isolated from the $CO_2$, the formation of a parasitic optical tail pulse is eliminated, thereby enhancing the optical power of the main pulse. As shown in FIG. 7a, in a conventional $CO_2$ TEA laser this parasitic pulse continues for a substantial amount of time after the main discharge pulse and correspondingly reduces the power of the main discharge pulse. However, as shown in FIG. 7b, by eliminating this parasitic tail pulse the power of the main pulse is enhanced. A second advantage which is realized by the use of the invention is that the composition of the lasant gas mixture may be optimized separately from the composition of the preionization gas mixture. For example, an increased $N_2$ concentration may be employed in the modules while maintaining the main discharge gas mixture at some desired concentration of $CO_2$. This results in improved preionization by supplying proportionately more UV photons for $CO_2$ photoionization which further results in an improved glow discharge and improved laser output performance. Still another advantage which accrues from the use of the invention is especially apparent in those types of lasers which employ a catalyst within or in communication with the main discharge region, the catalyst providing for the recombination of CO and $O_2$ into $CO_2$. In that no catalyst recombination sites are occupied by $N_2$ or nitrogen compounds the entire catalytic surface is made available for $CO_2$ recombination. Furthermore, by isolating the $N_2$ from the $CO_2$, dissociated oxygen atoms cannot combine with nitrogen to produce undesirable $NO_x$ molecular species.

It is within the scope of the invention to provide the main discharge compartment with a seed gas or gases, such as CO, which facilitates the rapid recombination of CO and $O_2$.

An important aspect of the invention is that the lasant gas is substantially devoid of $N_2$. In that the power of the parasitic tail pulse has been found to vary approximately exponentially with the concentration of $N_2$ within the main discharge compartment, a concentration of $N_2$ which is less than approximately one percent has been found to provide satisfactory operation. That is, a total $N_2$ concentration which is less than approximately one percent of the total lasant gas volume within the main discharge compartment has been found to substantially eliminate the parasitic optical tail pulse.

As was previously stated what has been described are illustrative embodiments of the invention and, as such, the invention should not be construed to be limited to only that disclosed above. In that those having skill in the art may derive a number of modifications to the invention based upon this disclosure it is intended that the invention be limited only as defined by the appended claims.

What is claimed is:

1. A $CO_2$ gas laser comprising:
    means for defining a resonant cavity structure, said resonant cavity structure including a lasant gas comprised of $CO_2$, said lasant gas being substantially devoid of $N_2$ for substantially eliminating a generation of a parasitic optical tail pulse during an operation of said $CO_2$ gas laser;
    means for generating an electrical discharge within said resonant cavity structure for ionizing said lasant gas such that said lasant gas emits electromagnetic radiation; and
    means for preionizing said lasant gas with ultraviolet radiation, said preionizing means comprising at least one sealed module means containing a gas comprised of $N_2$, said sealed module means substantially isolating said $N_2$ gas from said lasant gas, said sealed module means comprising means for ionizing said $N_2$ gas such that said $N_2$ gas emits ultraviolet radiation, said ionizing means being coupled to electrical terminal means extending through an outer surface of said sealed module means, said preionizing means further comprising electrical coupling means adapted for conductively coupling to said electrical terminal means such that said sealed module means is removably coupled to said laser, and wherein
    said module means further comprises window means comprised of a material substantially transparent to ultraviolet radiation for coupling ultraviolet radiation emitted by said $N_2$ gas to said lasant gas.

2. A $CO_2$ gas laser set forth in claim 1 wherein said means for preionizing comprises a first and a second one of said sealed module means and wherein said means for generating an electrical discharge comprises a first elongated electrode and a second elongated electrode disposed in a parallel spaced apart manner one from the other and defining a discharge region therebetween, said discharge region being disposed between said first and said second sealed module means, each of said first and said second sealed module means having a length substantially equal to a length of said discharge region.

3. A $CO_2$ gas laser as set forth in claim 2 wherein said first and said second elongated electrodes and said means for preionizing are coupled to a pulsed source of electrical potential and are energized substantially simultaneously thereby.

4. A $CO_2$ gas laser as set forth in claim 1 wherein said lasant gas is comprised of less than approximately one percent of $N_2$.

5. A sealed module for use in a gas laser for providing photoionization radiation to a lasant gas mixture comprised of $CO_2$, said lasant gas mixture being substantially devoid of $N_2$ for substantially eliminating a generation of a parasitic optical tail pulse during an operation of the laser, said sealed module comprising:
a photoionization gas comprised of $N_2$;
means for containing said photoionization gas, said containing means being substantially gas tight to prevent an escape of $N_2$ from said container means and into the lasant gas;
means, disposed within said containing means, for inducing said photoionization gas to emit electromagnetic radiation within a predetermined range of wavelengths;
means for electrically coupling said inducing means to a source of electrical energy, said coupling means being removably coupled to the source such that said containing means may be installed within and subsequently removed from a laser; and
window means, comprised of material substantially transparent to electromagnetic radiation within the predetermined range of wavelengths, for coupling the electromagnetic radiation out of said containing means.

6. A sealed module as set forth in claim 5 wherein said photoionization gas is comprised of $N_2$ and He.

7. A sealed module as set forth in claim 5 wherein containing means is comprised of a glass envelope.

8. A sealed module as set forth in claim 7 wherein said means for coupling is comprised of a first and a second electrical terminal each of which extends through an outer surface of said glass envelope.

9. A sealed module as set forth in claim 7 wherein said window means is sealed over an opening within said glass envelope.

10. A sealed module as set forth in claim 9 wherein the predetermined range of wavelengths is approximately 0.1 micrometers to approximately 0.2 micrometers.

11. A sealed module as set forth in claim 10 wherein said window means is comprised of a substantially planar body of LiF.

12. A sealed module as set forth in claim 10 wherein said window means is comprised of a substantially planar body $MgF_2$.

13. A sealed module as set forth in claim 5 wherein said inducing means is comprised of a corona discharge type of device.

14. A sealed module as set forth in claim 5 wherein said inducing means is comprised of an electrical spark generating device.

15. A sealed module for use in a gas laser for providing photoionization radiation to a lasant gas mixture, said lasant gas mixture including $CO_2$ and being substantially devoid of $N_2$ for substantially eliminating a generation of a parasitic optical tail pulse during operation, said sealed module containing a photoionization gas comprised of $N_2$ and isolating said photoionization gas from the lasant gas such that the lasant gas is maintained as a gas mixture that is substantially devoid of $N_2$, said sealed module comprising:
sealed container means having the photoionization gas comprised of $N_2$ contained within;
means, disposed within said sealed container means, for inducing said photoionization gas to emit electromagnetic radiation within a predetermined range of wavelengths, said sealed container means further comprising means, comprised of material substantially transparent to electromagnetic radiation within the predetermined range of wavelengths, for coupling the electromagnetic radiation out of said sealed container means; and
electrical coupling means extending from within said sealed container means at least to an outer surface thereof for coupling said inducing means to a source of electrical energy, said electrical coupling means being adapted for being removably coupled to the source such that said sealed container means may be installed within and subsequently removed from a laser cavity.

16. A sealed module as set forth in claim 15 wherein said sealed container means is comprised of a gas tight container having a window comprised of a material that is substantially transparent to ultraviolet radiation generated within said sealed container means.

17. A sealed module as set forth in claim 16 wherein said window has a length and a width substantially equal to that of a discharge region of a $CO_2$ gas laser cavity, and wherein said sealed module is removably coupled to the laser cavity such that the ultraviolet radiation generated within said sealed container means is substantially uniformly provided to the discharge region through said window.

18. A sealed module as set forth in claim 15 wherein said inducing means is comprised of a semiconductor preionizer.

19. A sealed module as set forth in claim 15 wherein said inducing means is comprised of means for generating an arc of electrical current within said sealed container means.

* * * * *